(12) United States Patent  (10) Patent No.: US 9,147,150 B2
Morisse  (45) Date of Patent: Sep. 29, 2015

(54) SYNTHETIC GRASS IMPLANT WITH RFID TAG FOR GROUND-MARKING IN GRASSED AREAS

(71) Applicant: Philippe Marc Francois Morisse, Giscaro (FR)

(72) Inventor: Philippe Marc Francois Morisse, Giscaro (FR)

(*) Notice: Subject to any disclaimer, the term of this patent is extended or adjusted under 35 U.S.C. 154(b) by 75 days.

(21) Appl. No.: 14/178,705

(22) Filed: Feb. 12, 2014

(65) Prior Publication Data

US 2015/0227831 A1  Aug. 13, 2015

(51) Int. Cl.
*G06K 19/077* (2006.01)
*A41G 1/00* (2006.01)

(52) U.S. Cl.
CPC .......... *G06K 19/07758* (2013.01); *A41G 1/009* (2013.01)

(58) Field of Classification Search
CPC .............. G06K 19/041; G06K 19/005; G06K 2019/06253; G06K 19/067; G06K 19/07; G06K 19/077; G06K 19/07737; G06K 19/07758; A41G 1/009
USPC ................................................ 235/487, 492
See application file for complete search history.

(56) References Cited

U.S. PATENT DOCUMENTS

| | | | |
|---|---|---|---|
| 2005/0270156 A1* | 12/2005 | Ravet | 340/572.1 |
| 2007/0053201 A1* | 3/2007 | Dietz et al. | 362/559 |
| 2007/0135243 A1* | 6/2007 | LaRue et al. | 473/467 |
| 2008/0140233 A1* | 6/2008 | Seacat | 700/91 |
| 2009/0256688 A1* | 10/2009 | Khan | 340/323 R |
| 2010/0283630 A1* | 11/2010 | Alonso | 340/870.11 |
| 2012/0098641 A1* | 4/2012 | Whittle | 340/10.1 |
| 2013/0066448 A1* | 3/2013 | Alonso | 700/91 |
| 2014/0169758 A1* | 6/2014 | Sapoznikow et al. | 386/241 |
| 2014/0266160 A1* | 9/2014 | Coza | 324/207.11 |
| 2014/0361909 A1* | 12/2014 | Stelfox et al. | 340/870.07 |
| 2014/0371885 A1* | 12/2014 | Ianni et al. | 700/91 |
| 2015/0062440 A1* | 3/2015 | Baxter et al. | 348/734 |

* cited by examiner

*Primary Examiner* — Paultep Savusdiphol

(57) ABSTRACT

A synthetic grass implant/marker that serves as a surface mounted visual marker for a feature or device located nearby or underground and has all the features and advantages of such a synthetic grass implant, and that additionally includes an internally mounted RFID device such as an RFID tag or chip that can programmed with information concerning the feature or device it is marking, and which information can be obtained by utilizing an RFID reader to obtain the stored information from the implant/marker.

5 Claims, 3 Drawing Sheets

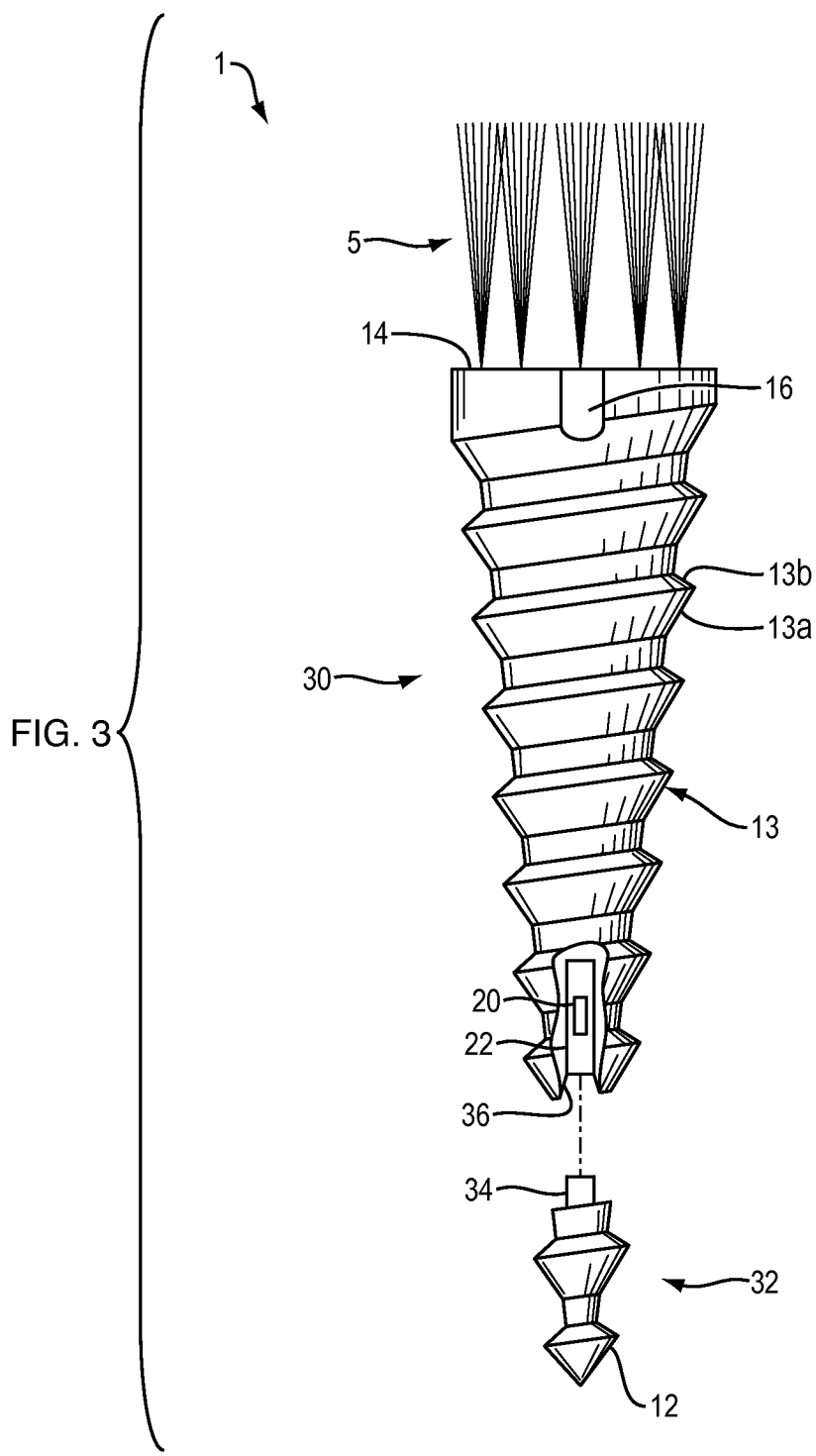

SYNTHETIC GRASS IMPLANT WITH RFID TAG FOR GROUND-MARKING IN GRASSED AREAS

TECHNICAL FIELD

The present invention relates to an implantable element for marking a lawn or other grassed and/or sodded area, for the purpose of signaling or marking the surface and underground or nearby features and more particularly, to such a device that includes an internal RFID device that allows the implanted element to store certain information about what is being marked and to transmit the stored information to an RFID reader upon request.

BACKGROUND INFORMATION

Synthetic grass implants for marking grassed or sodded surfaces comprising a body to be set up in the ground and having artificial grass blades protruding above the ground surface, are known, for example, from WO 95/12441 and WO02008068296A1 incorporated herein by reference.

WO 95/12441 discloses an implant/marker comprising a body to sink into the ground, on which are fixed blades of artificial grass. The upper part of the body is installed flush with the ground surface and the lower portion is pointed, its general shape is generally conical. The placement of the implant and its replacement is very easy and does not need to prepare the soil or digging because of its small size. It does not interfere with the traffic of people and vehicles on the marked surface.

The filaments of such devices are usually made from a polymeric material having, after obtaining the desired thickness of the filaments (a few tenths of millimeters to one or two millimeters), the characteristics of rigidity and flexibility to that they are prepared to rest and he bowed to the passage of a user of the land marked without risking injury to the user or damage to the device. Another feature of these devices is that the filaments are resilient and return to their position immediately after the passage of the user.

These devices, originally designed to be implanted on grassy surfaces and guide each tracing land boundaries, such as sports, are proving to be useful for other applications, in particular to provide various marking delineations on the ground. For example locations for campsites, the boundaries of a park or visualizing a path could be achieved by such devices.

Although such prior art implants/markers are very well suited for marking points or even lines in the top surface of grassed areas, they are less useful in marking underground features such as underground electrical lines, underground water, sewer or gas pipes, or other underground or hidden from view features or devices.

Although these prior art markers may provide a top surface indication that there is some feature or device located/buried nearby or underneath the marker, the marker does not provide any detailed information such as, for example, how deep the device or feature is; how big it is; how long it is; what date it was installed or the like. For such underground or hidden devices or features, it would be advantageous and desirable to have a very detailed information about what the implant/marker is marking.

Accordingly, what is needed is a synthetic grass implant/marker that serves as a surface mounted visual marker for a feature or device located nearby or underground and has all the features and advantages of such a synthetic grass implant, and that additionally includes a device such as an internal RFID tag or chip that can programmed with information concerning the feature or device it is marking, and which information can be obtained by utilizing an RFID reader to obtain the stored information from the implant/marker.

SUMMARY

The invention features a synthetic grass implant for ground marking of grassed surfaces which comprises a body, configured for being placed in ground and including upper and lower body portions. The upper and lower body portions are separate and distinct portions when the implant is in an unassembled condition, while the upper and lower body portions are joined together when the upper and lower body portions are assembled for use.

The upper body portion includes first and second ends. The upper body portion includes a top surface proximate its first end in which is mounted a plurality of artificial grass strands projecting upwardly therefrom and above a surface of adjacent ground in which the implant is inserted. The top surface of the upper body portion is disposed substantially flush with said ground surface when the implant is installed in the ground.

The second end of said body upper portion includes a cavity opening extending into a cavity formed in the upper body portion, the cavity opening having a predetermined shape and size, preferably tapered. An RFID device is disposed in the cavity.

The lower body portion includes first and second ends. The first end of the lower body portion includes a tapered projection having the same predetermined shape as the predetermined tapered shape of the cavity opening in the second end of the upper body portion. The tapered projection has a size which is slightly larger than the predetermined size of the tapered cavity opening and whereby the tapered projection is configured to frictionally engage with the tapered cavity opening.

In one embodiment, the body is conically shaped. The body may also include spirally arranged projections on an exterior surface of at least a portion of the body. The spirally arranged projections are configured to allow insertion of the implant into the ground by a screwing action. In a further embodiment, each of the spirally arranged projections may include an upper and a lower surface, and wherein the upper surface faces the top surface of the implant and has an angle measured from a vertical axis of the implant that is greater than an angle of the lower surface measured from the some vertical axis.

In the preferred embodiment, the RFID device disposed in the cavity may be one of an Active RFID device, a Semi-Passive RFID device and a Passive RFID device.

BRIEF DESCRIPTION OF THE DRAWINGS

These and other features and advantages of the present invention will be better understood by reading the following detailed description, taken together with the drawings wherein:

FIG. 3 is a perspective and partial cut-away view of an implant device with an RFID device disposed in an internal cavity according to the teaching of the present invention.

DETAILED DESCRIPTION OF THE PREFERRED EMBODIMENTS

Figure 1:
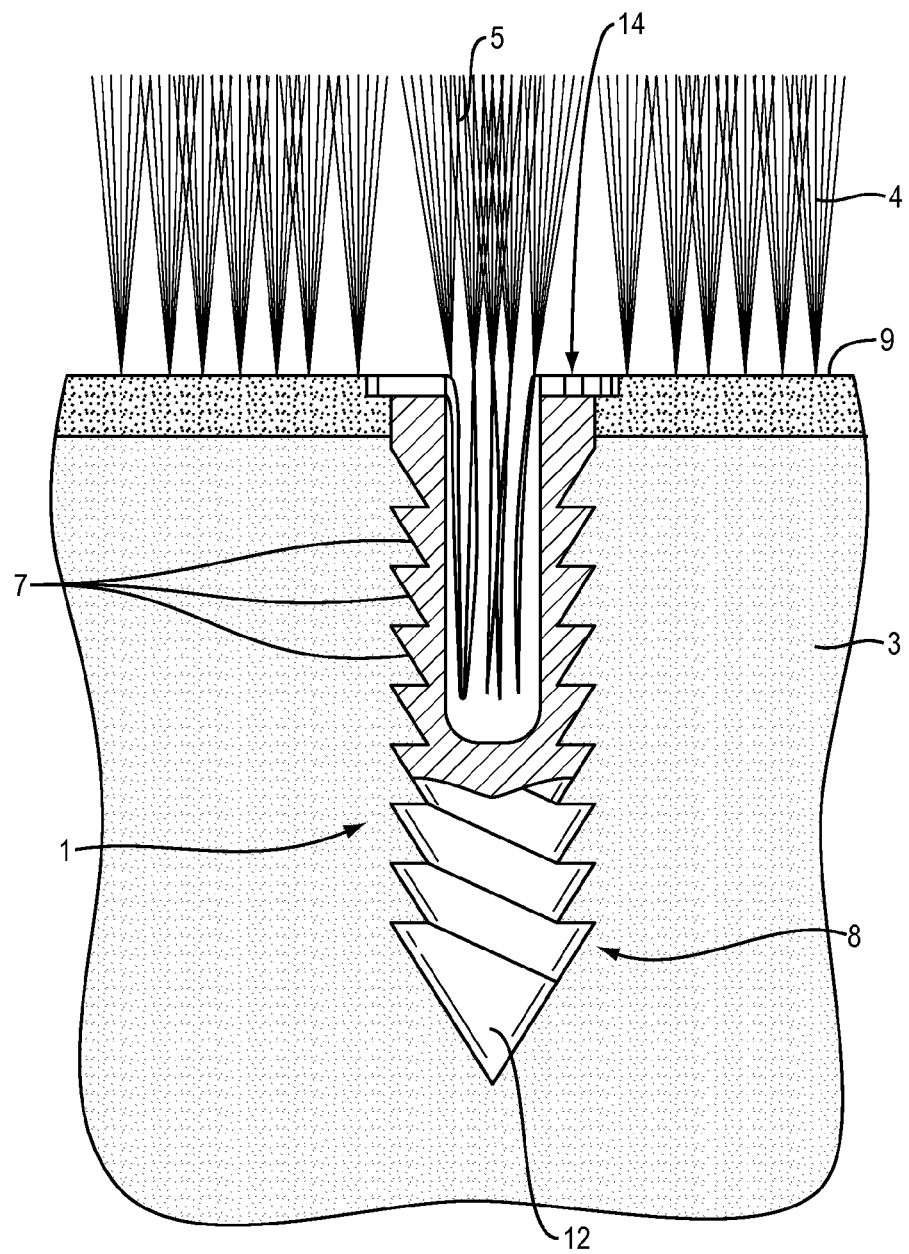
FIG. 1 is a cross-sectional view of an implant device utilized with an RFID tag according to the present invention.

Radio-frequency identification (RFID) is the wireless non-contact use of radio-frequency electromagnetic fields to transfer data, for the purposes of automatically identifying and/or tracking "tags" attached to objects. RFID technology has two components—the reader and the tag. The tags contain electronically stored information. Some tags are powered by and read at short ranges (a few meters) via magnetic fields (electromagnetic induction) while others use a local power source such as a battery, or else have no battery but collect energy from the interrogating electromagnetic field, and then act as a passive transponder to emit microwaves or UHF radio waves (i.e., electromagnetic radiation at high frequencies). Battery powered RFID tags may operate at ranges of hundreds of meters. Unlike a bar code, RFID tags do not necessarily need to be within line of sight of the reader, and may be embedded in the tracked object.

There are several types of RFID devices (often referred to as tags or chips—which terms may be used interchangeably herein) typically referred to as Active, Semi-Passive and Passive RFID Tags. Active and semi-passive RFID tags use internal batteries to power their circuits. An active tag also uses its battery to broadcast radio waves to a reader, whereas a semi-passive tag relies on the reader to supply its power for broadcasting. Because these tags contain more hardware than passive RFID tags, they are more expensive.

Passive RFID tags rely entirely on the reader as their power source. These tags are typically read up to 20 feet (six meters) away, and they have lower production costs, meaning that they can be applied to less expensive merchandise. These tags are manufactured to be disposable.

Most passive RFID tags cost between seven and 20 cents U.S. each while active and semi-passive tags are more expensive. The RFID industry's goal is to get the cost of a passive RFID tag down to five cents each or less once more merchandisers adopt it. Whereas a railway car might have an active RFID tag, a bottle of shampoo would likely have a passive tag.

Another factor that influences the cost of RFID tags is data storage. There are three storage types: read-write, read-only and WORM (write once, read many). A read-write tag's data can be added to or overwritten. Read-only tags cannot be added to or overwritten—they contain only the data that is stored in them when they were made. WORM tags can have additional data (like another serial number) added once, but they cannot be overwritten. The amount of information that RFID tags store can vary. Passive tags, such as discussed herein typically store about 1024 bytes of information, or 1 kilobyte.

For purposes of the present invention, although passive RFID tags with read-write memory of suitable size is preferred, this is not a limitation of the present invention as any type of RFID tag presently known or that may be developed in the future is considered within the scope of the present invention.

Utilizing RFID technology also requires the use of an RFID reader. The RFID tag reader has two parts—a transceiver and an antenna. The transceiver generates a weak radio signal that may have a range from a few feet to a few yards. The signal is necessary to wake or activate passive tags and is transmitted through the antenna. The signal itself is a form of energy that can be used to power the tag in the case of passive RFID tags.

A transponder is the part of the RFID tag that converts that radio signal transmitted from the reader into usable power, as well as sends and receives messages to and from the RFID tag. The RFID signal transmitted from the reader generates the power for the RFID tag to work with and wakes up the transponder in the RFID tag. The transponder in the RFID tag immediately upon being woken up, sends out all the information it has stored on it. This whole process can take as little as a few milliseconds.

FIG. 1 shows a marker/implant according to the preferred (but not exclusive) embodiment of the invention and comprises a body 1 of generally cylindrical shape with a conical end 8 having point 2 at its lower end. The body 1 is integrally buried in the soil 3 covering the ground, the lawn or grass being shown generally at 4. The implant or marker 1 according to one feature of the invention includes artificial grass blades 5 protruding from the upper face or surface 6 of the body 1. The upper face or surface 6 of the upper part of the body 1 is substantially flush with the surrounding surface 9 when installed. The artificial or synthetic grass strands 5 protrude from this face or surface 6 substantially in parallel with the grass blades 4.

The artificial or synthetic grass strands 5 are fastened in one or more tufts in the body 1 and are anchored in the latter by any suitable means. The outer face of the cylindrical part of the body 1 advantageously includes a sawtooth edge region 7 which avoids or prevents tearing the implant out of the ground if pulling on the artificial or synthetic grass strands 5. The implant is put in place by sinking it into the ground 3 by any appropriate and suitable means including direct impact on the upper surface 6 to "drive" the marker 1 into the ground 3 or by screwing it into the ground using the of two recesses or indentations 16 as will be described below in connection with FIG. 2. The markers 1 may be installed from place to place, along a line of any shape, or along a perimeter of any shape, to mark the surface of a lawn or other grassy area.

The synthetic grass strands 5 may be of any desired color. For example, a particular color may be used for a marker which is denoting a gas line while a different color may be used to denote an electric line. In addition, if the marker is often sought after dark, the synthetic grass strands 5 may include a fluorescent or luminescent element which assists in locating the marker after dark.

Figure 2:
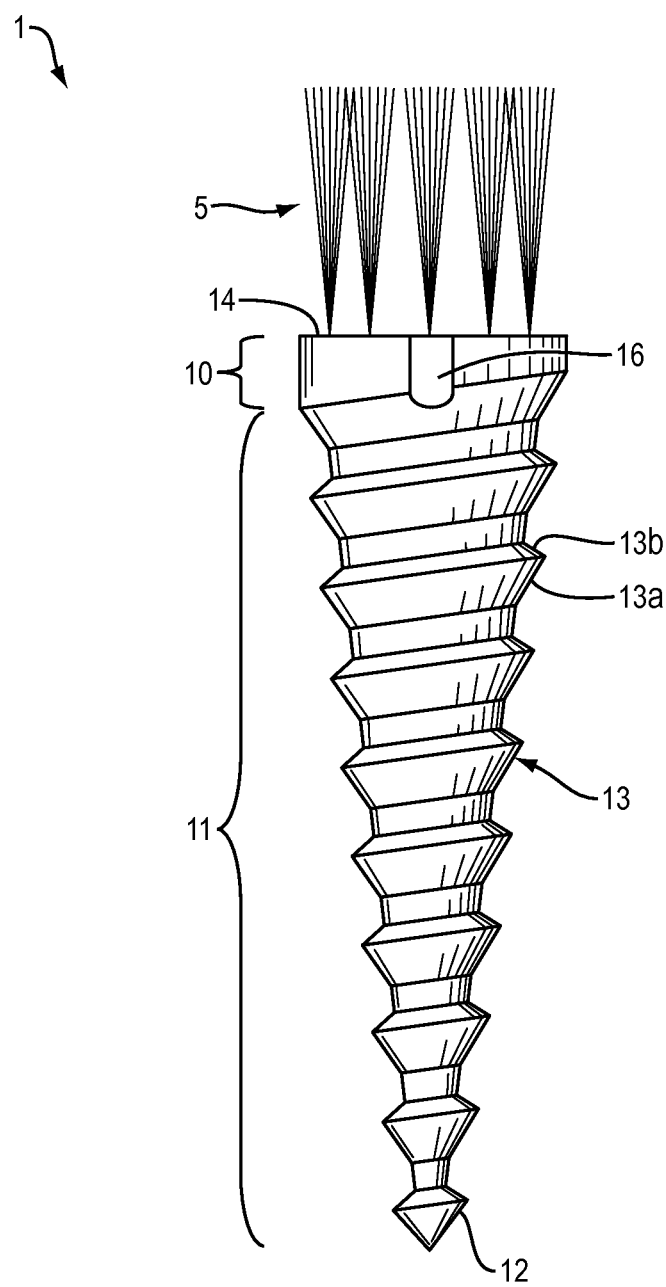
FIG. 2 is a perspective front view of another embodiment of an implant device which may be utilized to carry out the invention disclosed herein.

FIG. 2 illustrates a preferred (but not limiting) embodiment of the implant/marker that is utilized with the present invention, wherein the body includes an upper cylindrical portion 10 in which the synthetic grass strands 5 are anchored and a lower portion 11 of generally conical shape with a tip 12 at the lower end and a screw thread 13 from one end to the other of said lower part 11.

The screw thread 13 profile is asymmetrical that is, the lower face 13a is substantially inclined relative to the vertical axis of the implant and also the upper face 13b of the screw thread 13, so that the net effect of the lower face 13a and the upper face 13b of the screw thread 13 is to simultaneously provide holding of the implant 1 in the ground and preventing accidental wrenching or removal of the implant from the ground.

The upper surface 14 of the marker 1 is generally flat, and has a number of blind holes (not shown) evenly distributed and in which are attached small clumps of synthetic grass strands 5. For example, it is expected that nine holes 15 each receiving a tuft comprising of some number (5-15 Philippe please verify) of strands 5, about 12 being preferable, a few centimeters (5 for example) long. The strands 5 are flexible enough that they can be walked or driven on and a grass shearing device such as a lawn mower can be passed over the strands 5 without risk of accident, injury or damage to the strands.

In general, the density of strands 5 is very loose because the implant/marker 1 performs a signaling or marking function and is not designed for the establishment of an artificial marking line marking. Density, seen at the free ends of the strands 5 is, for example, less than ten per square centimeter.

The portion 10 has a length of on the order of a few centimeters, for example 3.5 cm, while the height of the body of the implant (10, 11) in total is of the order of ten centimeters. The whole of the implant body 1 is advantageously made in one piece by molding a suitable plastics material. The implant of FIG. 2 may be installed by screwing it into the ground using a suitable fork shaped tool having two "fingers" cooperating with two recesses or indentations 16 diametrically opposed to the periphery of the face 14 of the marker 1. The insertion and potential withdrawal of the implant (if needed) is accomplished by screwing or unscrewing the implant, an action that is very simple, easy and does not involve any digging or mishandling of the lawn, thus preserving its integrity.

The implants or markers 1 of the invention, whether they are the embodiment shown or any other embodiment, may be used singularly or may be placed at regular intervals along a line or boundary to mark the grass or lawn surface. The implant/marker 1 of the invention may also be used for permanent indications on a lawn or other grassy area of any object or structure hidden beneath the surface, such as a pipe, valve, septic tank, electrical wire, etc. wherein it is important to know the location of such object or structure.

As previously discussed, the present invention features a marker 1, FIG. 3, of the type described herein or of a different type which includes an RFID tag or chip 20 located or disposed inside a cavity 22 formed in the Interior of the body portion of the marker 1.

According to the preferred embodiment of the invention, the marker 1 is molded as to piece; the $1^{st}$ piece 30 which is the larger of the 2 pieces and includes the cavity 22 in which is disposed the RFID tag 20 and a $2^{nd}$ portion 32 which includes the tip portion 12 of the marker 1. The $2^{nd}$ portion 32 preferably includes a tapered tab portion 34 which is sized and shaped to friction fit securely into a corresponding shaped opening 36 at the end of the cavity 22 in the $1^{st}$ piece 30. The tapered tab portion 34 may be square or conical and shape. The size of the tapered tab portion 34 is such that after it is inserted into the correspondingly shaped opening 36, it cannot be easily removed. It is contemplated that inserting the tab portion 34 into the shaped opening 36 will be accomplished using a mechanical press or the like to ensure a very secure friction fit between the 2 pieces. In addition, the tab 34 serves to prevent water from infiltrating the cavity 22 once the marker 1 is inserted in the ground.

The RFID tag may be any type of RFID device as described above as desired by the user. It is contemplated that the type of information which may be stored on the RFID tag includes but is not limited to information describing the marked object or device (such as a water pipe, electrical pipe, valve, sewer pipe or the like); its size, length or the like; its installation date; last service date; its GPS coordinates; its orientation using GPS coordinates or the like; and any other relevant information that would assist someone in utilizing the marker 1 to ascertain desired and/or required information about the object being marked. In this manner, since such objects being marked are typically not visible, a user gains valuable insight into the object being marked.

Although the marker 1 of the present invention is typically installed in a horizontal grassed area, it is not necessary that the object being marked be below the surface of the grassed area but rather, a marker 1 in accordance with the teachings of the present invention may be installed in a grassed area to mark an object in an adjacent wall or other vertical structure.

Accordingly, the present invention provides a novel and nonobvious marker that can be installed in a grassed area without fear of causing injury to a user or vehicle which comes in contact with the synthetic grass elements in the marker but which can provide significant valuable information about one or more objects being marked by the marker.

The invention is obviously not limited to the embodiments described and illustrated but covers all variants in particular with regard to the shape and dimensions of the upper portion 10 of the implant body, which may have, for example, a polygonal profile, and the lower part 11 which may be cylindrical or conical, smooth, with or without anti-stripping projections, regardless of their shapes and arrangements. Similarly, the number, location, size or color of strands 5, their mode of attachment to the implant body, and the nature of their constituent material can vary within wide limits without departing from the scope of the present invention.

Modifications and substitutions by one of ordinary skill in the art are considered to be within the scope of the present invention, which is not to be limited except by the allowed claims and their legal equivalents.

The invention claimed is:

1. A synthetic grass implant for ground marking of grassed surfaces, comprising:
   a body, configured for being placed in ground and including upper and lower portions, said upper and lower portions separate and distinct portions when said implant is in an unassembled condition and said upper and lower portions joined together when said upper and lower portions are assembled for use, said upper portion including first and second ends, said upper portion including a top surface proximate said first end in which is mounted a plurality of artificial grass strands projecting upwardly therefrom and above a surface of adjacent ground in which the implant is inserted, said top surface disposed substantially flush with said ground surface when said implant is installed in the ground, said second end of said upper portion including a cavity opening extending into a cavity formed in said body, said cavity opening having a predetermined tapered shape and size;
   an RFID device disposed in said cavity; and
   said lower portion including first and second ends, said first end of said lower portion including a tapered projection having the same predetermined shape as said predetermined tapered shape of said cavity opening in said second end of said upper portion, and wherein said tapered projection has a size which is larger than said predetermined size of said cavity opening and which tapered projection is configured to frictionally engage with said cavity opening.

2. The implant according to claim 1, characterized in that said body is conically shaped.

3. The implant according to claim 1, characterized in that said body includes spirally arranged projections on an exterior surface of at least a portion of said body, said spirally arranged projections configured to allow insertion of the implant into the ground by a screwing action.

4. The implant according to claim 3, characterized in that each said spirally arranged projection includes an upper and a lower surface and wherein said upper surface faces said top surface of the implant and has an angle measured from a vertical axis of said implant that is greater than an angle of said lower surface.

5. The implant of claim 1 wherein said RFID device disposed in said cavity is selected from the group of RFID device consisting of an Active RFID device, a Semi-Passive RFID device and a Passive RFID device.

\* \* \* \* \*